United States Patent [19]

Stone et al.

[11] Patent Number: 4,662,043

[45] Date of Patent: May 5, 1987

[54] PROJECT PLATE SYSTEM

[75] Inventors: William S. Stone, East Jordan; Thomas M. Dittrich, Lake Leelaneau, both of Mich.

[73] Assignee: Sheffer Collet Company, Traverse City, Mich.

[21] Appl. No.: 690,320

[22] Filed: Jan. 10, 1985

[51] Int. Cl.$^4$ .............................................. B23Q 3/02
[52] U.S. Cl. .................................... 29/33 P; 29/563; 29/559; 82/2.7; 198/345; 279/1 D
[58] Field of Search ............. 29/568, 33 P, 563, 38 A, 29/467, 559; 198/345, 346.1; 409/221; 901/33; 82/2.5, 2.7; 279/1 D

[56] References Cited

U.S. PATENT DOCUMENTS

| | | | |
|---|---|---|---|
| 1,505,056 | 8/1924 | Murray | 409/221 |
| 2,633,777 | 4/1953 | Hoern | 409/221 X |
| 2,787,175 | 4/1957 | Schurger | 409/221 X |
| 3,177,775 | 4/1965 | Alisauskis | 409/233 |
| 3,191,951 | 6/1965 | Parker | 279/1 D |
| 3,540,566 | 11/1970 | Perry et al. | 198/345 |
| 3,550,487 | 12/1970 | Randall et al. | 29/568 X |
| 3,914,853 | 10/1975 | Jauch | 29/563 |
| 3,986,617 | 10/1976 | Blomquist | 29/563 X |
| 4,184,669 | 1/1980 | Bald | 269/309 |
| 4,206,932 | 6/1980 | Felker | 279/1 D |
| 4,253,559 | 3/1981 | Myers et al. | 198/345 |
| 4,309,600 | 1/1982 | Perry et al. | 29/563 X |
| 4,550,922 | 11/1985 | Hall et al. | 279/119 |

FOREIGN PATENT DOCUMENTS 1355807 6/1974 United Kingdom .

OTHER PUBLICATIONS

Concept—published by Cincinnati Milacron Company—copyrighted 1979.

Primary Examiner—Z. R. Bilinsky
Attorney, Agent, or Firm—Price, Heneveld, Cooper DeWitt & Litton

[57] ABSTRACT

A system for positioning and holding workpieces for successive machining at several work stations or machining by several machines at a multi-tool cell incorporating a workpiece holding and transporting project plate and a self-centering support chuck at every machine for holding and automatically positioning the project plate and its workpiece with a repeatably high degree of accuracy using the axial centerline of the support chuck as the reference of concentricity by which the tool and workpiece are addressed to each other.

10 Claims, 13 Drawing Figures

PROJECT PLATE SYSTEM

FIELD OF THE INVENTION

This invention relates to machine tools and more particularly to a plate to which a part or workpiece can be secured in a very precisely located position indexed to the geometric center of the plate and the plate, with workpiece attached, moved from tool to tool and at each tool the plate is mounted on a chuck with the plate maintaining very precise positioning of the workpiece with respect to each tool because it is always precisely positioned with respect to the axial center of the chuck.

BACKGROUND OF THE INVENTION

Many products or workpieces require multiple machine operations each necessitating a different tool and in many cases a different position of the workpiece with respect to the tool. Much effort has been devoted to solving the problems which arise from this situation. The most fundamental of these problems is tolerance accumulation and misalignment. One of the most common approaches to this problem has been to mount the workpiece on a jig or plate-like support and transport the workpiece so mounted from tool to tool. At each tool means are provided for grasping the support and holding it rigidly in position for the tool to perform its work on the workpiece. If there is any lack of accuracy in this means, the result is a corresponding lack of accuracy in the machining performed on the workpiece. When a workpiece and its support are moved progressively through several stations with one or more machining functions being performed at each station, the deviations from the original design dimensions become cumulative. The result is a high rate of unacceptable product or at least products which, at best, are only marginally acceptable.

One of the methods extensively used for parts requiring multiple machining has been the so-called transfer machine. In this arrangement the part to be machined is mounted on a pallet or plate and, while so mounted, is moved from machine to machine until all of the several machining functions have been performed on it. At each machine clamping devices position the plate and thus the part with respect to the tool. The indexing or locating means normally consists of a pair of locators one of which is a dowel or pin which fits into a precisely-sized opening in either the plate or the plate support and the other is a locator pin which is normally conical to shift or pivot the plate to its final position. The dowel and locator pins are spaced as far apart as possible to improve accuracy. In some cases edge engaging stops and a wedge and V-shaped mating edge opening are substituted for the dowel and locator pin. That part of the indexing means located at each of the tools must be individually fabricated and, therefore there is a certain variation in plate location from station to station due to tolerances in manufacture which cannot be eliminated. Typical of this type of system is that disclosed in U.S. Pat. No. 2,392,169 entitled "Machine Tool" issued Jan. 1, 1946 to J. H. Mansfield. This type of system even if very precisely constructed and carefully maintained cannot eliminate tolerance accumulations which prevent it from attaining repeatable accuracy within the range of $10^{-4}$ inch.

In an effort to overcome the accuracy deficiency of the system previously described, a gear type of indexing or registration means was introduced in which the plate or pallet, on one surface, has a ring of gear-like teeth and the station at which the tool is located is equipped with a matching ring of gear-like teeth designed to mesh with those on the pallet or plate. This arrangement is disclosed in U.S. Pat. No. 3,540,566 entitled "Connector System" issued Nov. 17, 1970 to C. B. Perry et al. In this arrangement the location of the plate with respect to the tool is controlled by the accuracy with which the teeth of the "connector" or indexing locator mesh. This type of indexing or locator arrangement is utilized in the system disclosed in U.S. Pat. No. 3,543,392 entitled "Machine Tools Having Conveyor Means Extending Therebetween and Carrying Pallet Means Which Are Selectively Connectable to the Machine Tools" issued Dec. 1, 1970 to C. B. Perry et al. and again in U.S. Pat. No. 4,309,600 entitled "Machine Tool" issued Jan. 5, 1982 to C. B. Perry et al. This system, at best, can attain an accuracy of 0.0005 of an inch. The thrust of the system is circumferential accuracy. However, it is much less effective in controlling concentricity. To control concentricity, the teeth require very expensive, precision machining which, at best, falls short of the accuracy necessary to produce precise tolerance control. Further, this system requires the workpiece support, that is the pallet or plate, to be used only with tools having the identical registration system, i.e. the tools must all be manufactured by the same company. This latter is necessary because it is virtually impossible to produce registration rings of adequate identity of manufacture unless they are made on the same machines using the same machining techniques.

A further limitation on all of these prior efforts to solve the problem of machining a part at multiple stations has been that the proposed solutions have focused on holding the part or workpiece stationary while the tool is moved as contrasted with moving the workpiece against a stationary tool. This has greatly limited the utility of prior approaches to this problem. For example, none of the presently used systems can be used with a lathe because this requires movement of the workpiece rather than the tool.

Another approach to the problem has been that of machining the part in a "cell" or at a multi-tool work station. This approach is disclosed in U.S. Pat. No. 3,914,853, entitled "Apparatus For Transporting Workpieces" issued Oct. 28, 1975 to K. Jauch. This approach, utilizing a single work station or cell at which multiple machine operations are performed as the part is relocated within the cell to align it successively with each of the tools also does not solve the tolerance accumulation problem. The system disclosed in the Jauch patent moves the part in a circle from plate holder to plate holder to present it in succession to a series of tools arranged in a circle. At each tool the part has to be positioned relative to the tool by one of the various indexing methods previously described with the same tolerance accumulation. While this type of arrangement automates the handling of the parts of workpieces, it does not address the problem of reducing tolerance accumulation.

The difficulty with prior attempts to solve this problem has been the absence of a single, dependable means common to all work stations which can be relied upon at every work station to repeatedly position the workpiece accurately with respect to the tool which is to be applied to it. A major difficulty with prior solution attempts is that, from a cost standpoint, it is not possible to make the means for holding the workpiece support at each work station precisely identical. Even in those cases when it may have been accomplished, the accuracy has been temporary due to the effects of such factors as thermal changes, wear and the presence of extraneous material such as chips on index surfaces.

BRIEF DESCRIPTION OF THE INVENTION

It has been recognized that great accuracy can be attained if both the tool and the workpiece support are integral parts of the same machine or the two are rigidly connected as disclosed in U.S. Pat. No. 4,343,073 entitled "Base Support for Transfer Machines" issued Aug. 10, 1982 to J. H. Brems. Even greater accuracy can be maintained if the target for machining on the workpiece and the tool can be made concentric about a single common axis. Although this has been recognized, it has not been achieved in situations in which the workpiece must be transported from machine to machine to accomplish all of the necessary machining which must be coordinated within very close tolerances.

This invention accomplishes this objective and overcomes the difficulties which have heretofore frustrated prior attempts to achieve a high degree of accuracy between the various machining operations performed on the same part coupled with dependable repeatability from part to part. The invention provides a project plate which itself is very accurately fabricated and designed to be gripped by a self-centering chuck in such a manner that it is always automatically positioned concentrically of the chuck to a very high degree of accuracy. The invention provides an identical, self-centering chuck to support and locate the workpiece holding project plate at every work station. Thus, the project plate at every work station will be automatically accurately positioned with respect to the chuck's centerline because the single position controlling factor is the circular indexing surface of the project plate which indexing surface is the same one at every station. The chucks, being self-centering, automatically position the central axis or reference index of the project plate concentrically with that of the chuck. At each work station the tool and the project plate supporting chuck are preferably part of the same machine and thus can be initially indexed with respect to each other with a very high degree of accuracy and this relationship can be maintained since neither the tool nor the support are thereafter repositioned with respect to each other. Thus, the central axis of the chuck and the central axis of the project plate provide a single reference which has previously been accurately positioned with respect to the tool.

Mounted on the project plate is workpiece supporting means which precisely locates the workpiece with respect to the central axis of the project plate. The workpiece supporting means are custom designed for each particular part design. However, very large quantities of parts or workpieces can be machined using the same project plate and its custom designed workpiece support. This provides dependable, automatic and accurate workpiece location suitable for high speed machining of high production products. Once the part to be machined has been precisely located on the project plate with respect to the central axis of the project plate, the project plate with its part, can be relocated at any number of different machines substantially without any tolerance accumulation because at each machine the chuck at that machine will position the plate with respect to the chuck's and thus the tool's reference index identically to every other one of the machines.

DESCRIPTION OF THE PREFERRED EMBODIMENT

Figure 1:
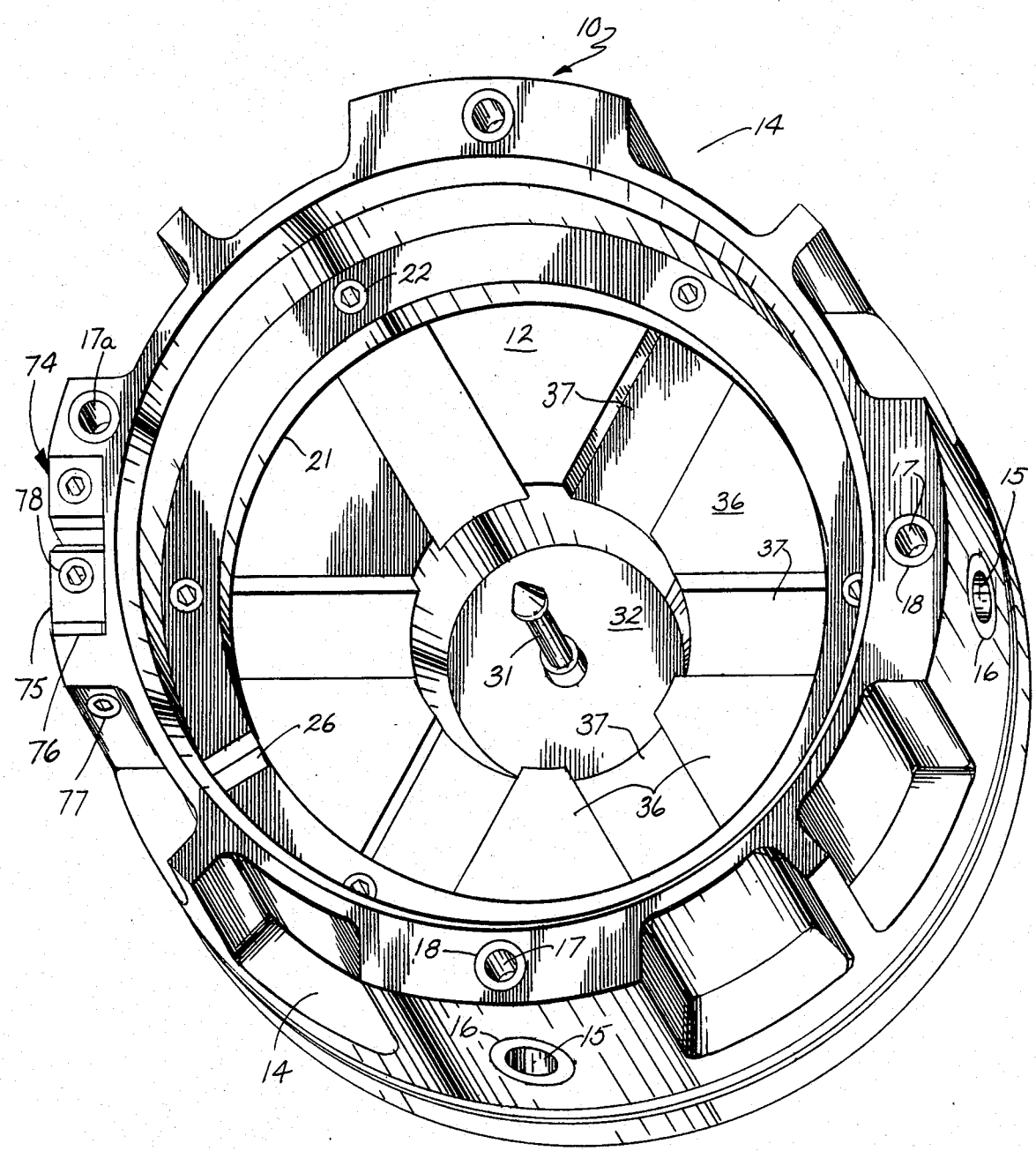
FIG. 1 is a perspective rear view of the project plate of this invention.
Figure 2:
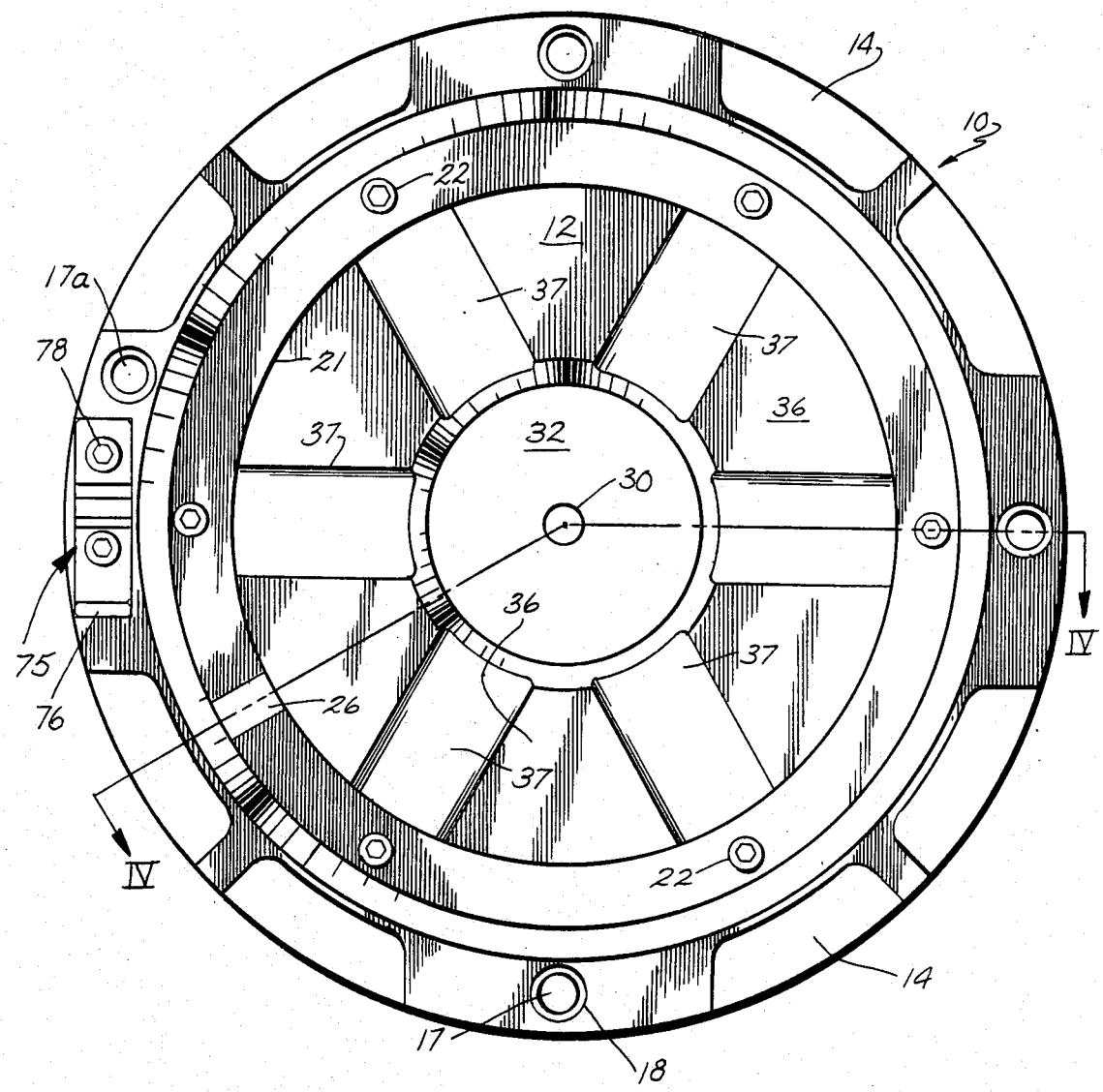
FIG. 2 is a rear view of the project plate.
Figure 4:
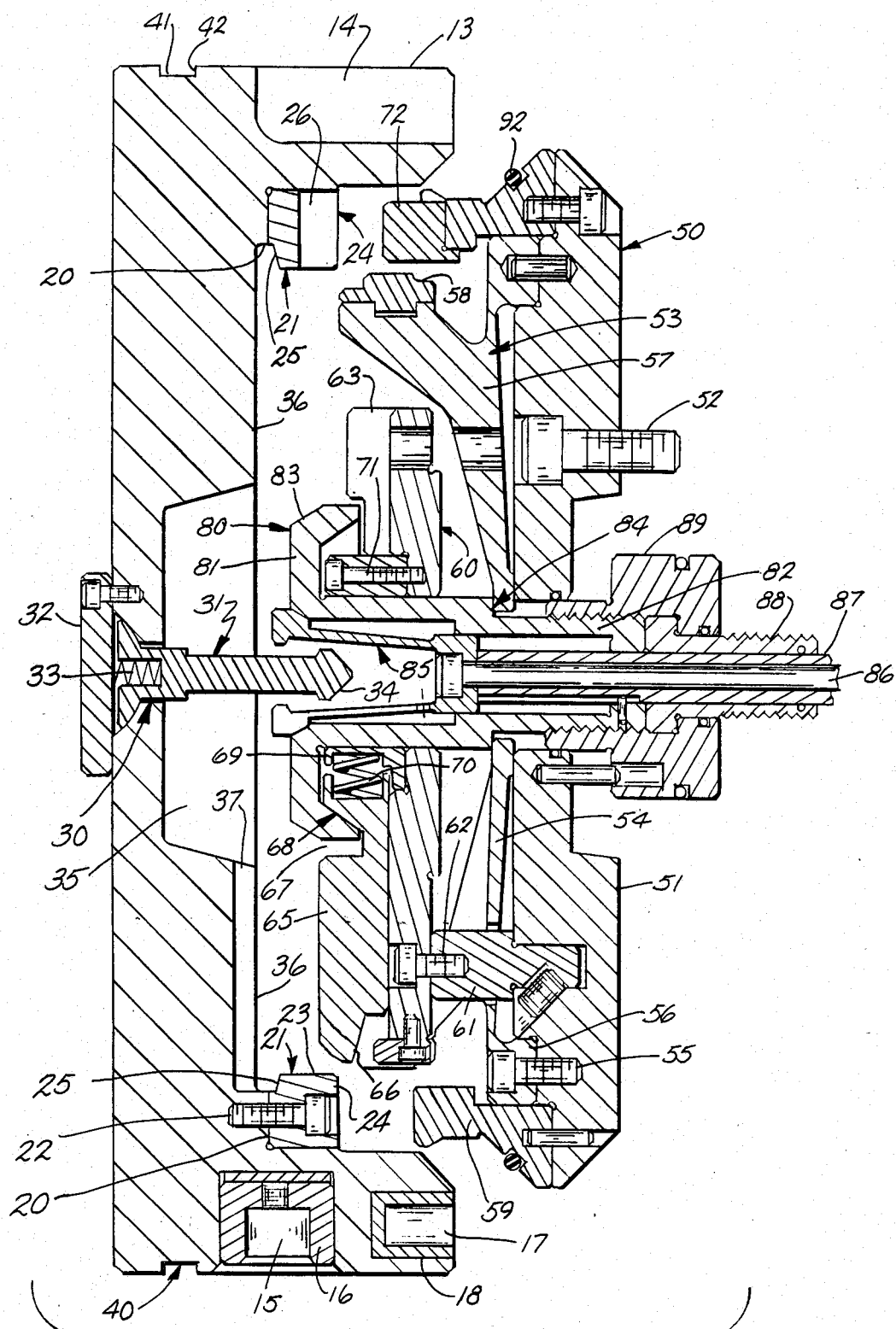
FIG. 4 is a sectional view taken along the plane IV—IV of FIG. 2 illustrating the project plate and its supporting chuck positioned ready for assembly.
Figure 6:
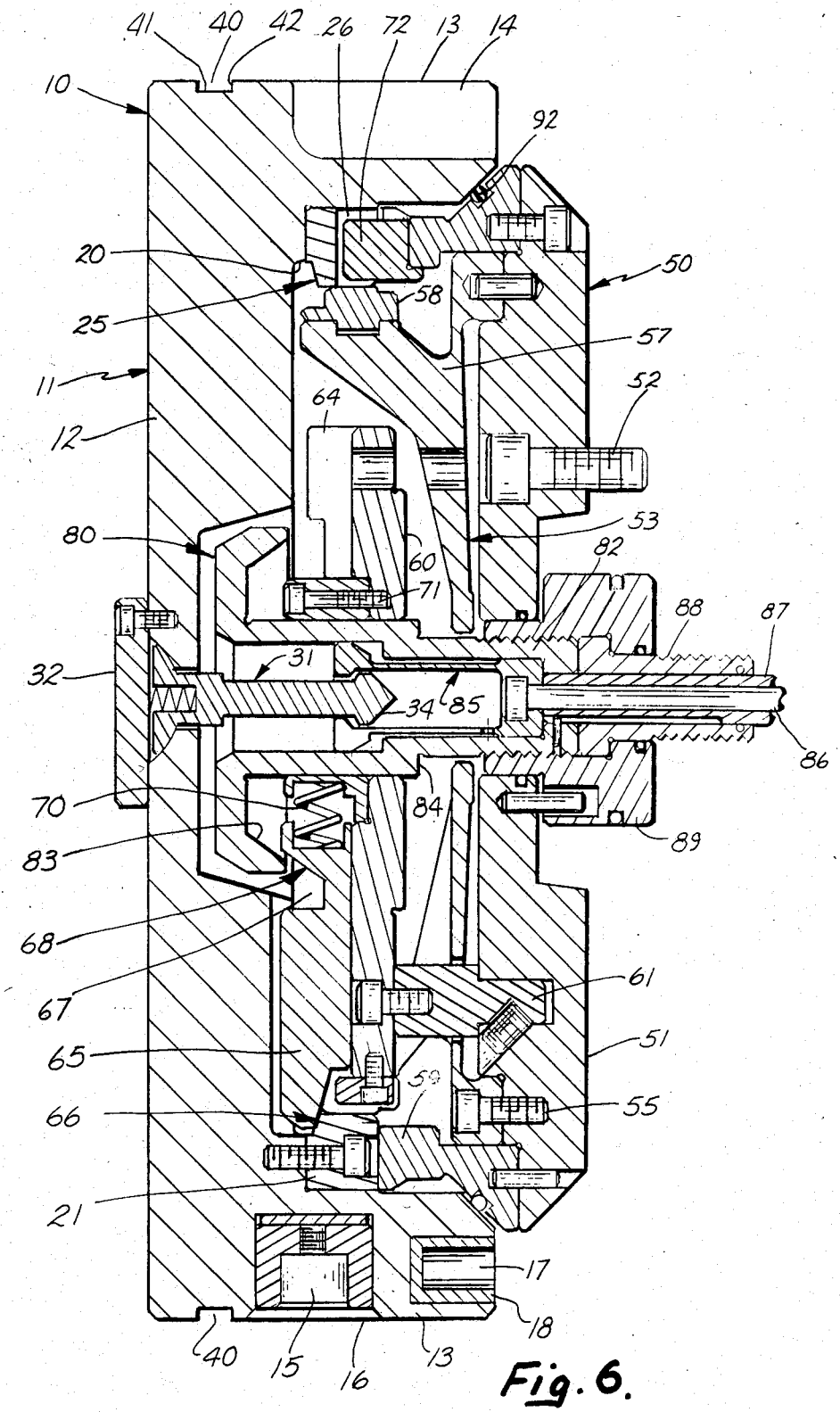
FIG. 6 is a sectional view taken along the same plane as FIGS. 4 and 5 illustrating the project plate and support chuck assembled and locked together.
Figure 7:
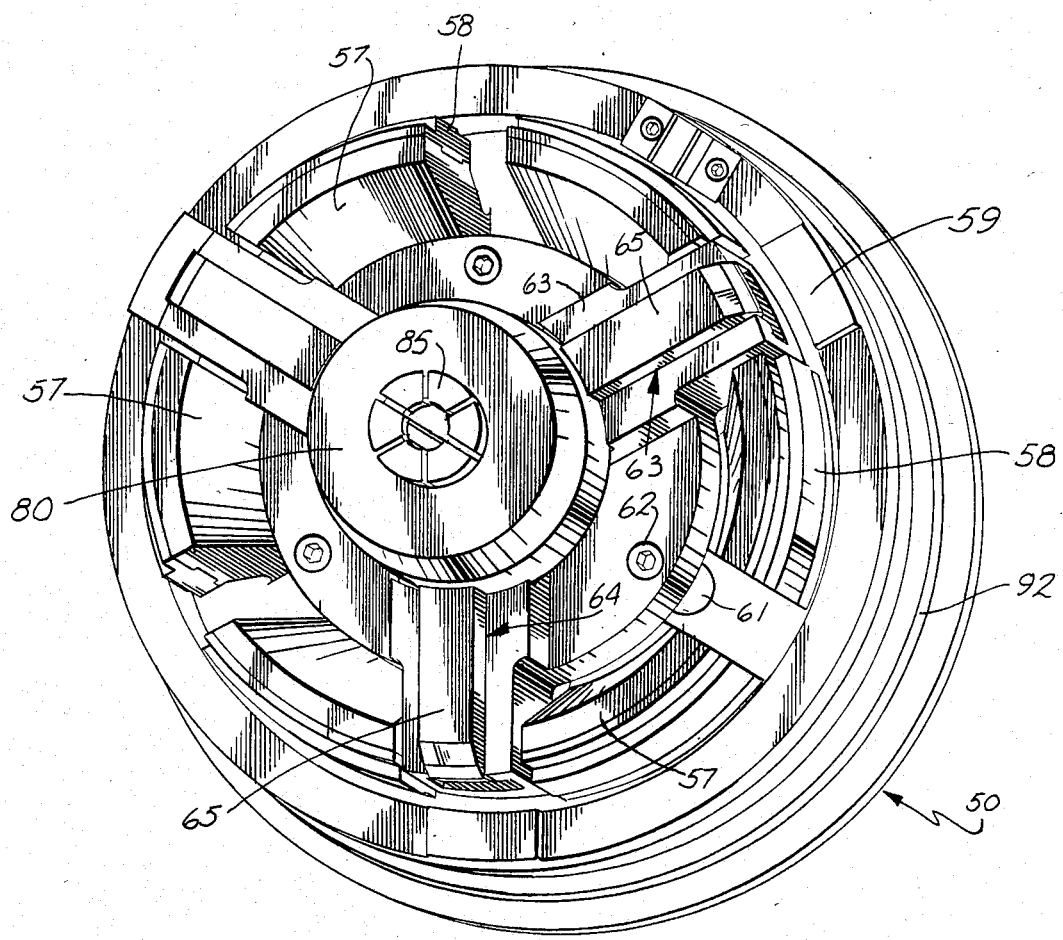
FIG. 7 is a perspective front view of the support chuck for the project plate.
Figure 14:
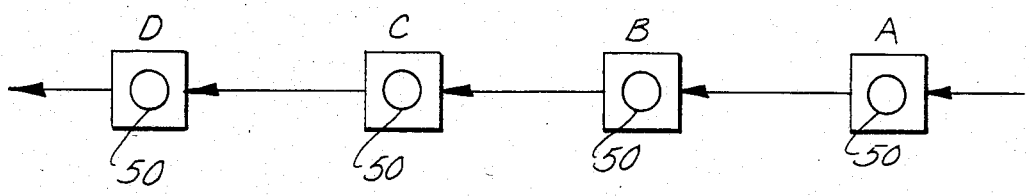

Referring to FIG. 6, the numeral 10 refers to a project plate and the numeral 50 to its supporting chuck. The project plate 10 has a body 11 consisting of a circular face plate portion 12 and an annular rearwardly extending peripheral flange 13. The peripheral flange 13 has a plurality of external pockets or recesses 14 to reduce weight while maintaining a wall thickness capable of resisting any tendency to flex or twist (FIGS. 1 and 2). It is essential to this invention that the project plate 10 remain rigid and precisely maintain its dimensions under all circumstances. Radially extending sockets 15 are provided at 90° spacings in the flange 13 (FIGS. 1 and 4). These sockets are provided with bushings 16 and provide means by which the project plate can be engaged by the tongs of a robot. The flange also has four axially extending sockets 17 each equipped with a bushing 18 (FIGS. 1, 2 and 4). These sockets are designed to engage matching pins on a rest or support for the plate when it is removed from the support chuck 50. One socket 17a is unequally spaced from the other sockets, thus providing an automatic means of circumferentially orienting the project plate on its support.

The inner or rear face of the face plate portion 12 has a rearwardly facing annular shoulder 20 (FIG. 4). This is very accurately machined so that it is precisely located axially with respect to the front face of the project plate. Seated on the shoulder 20 is a locator ring 21 secured by cap screws 22 (FIGS. 1, 2 and 4). This ring is also precisely machined to maintain a uniform and very accurate axial thickness to accurately position its rear face 24 with respect to the front face of the project plate and also to maintain a radially inner face 23 which is uniformly and accurately concentric with the project plate. The accuracy of the rear face 24 and radially inner face 23 are very important because these surfaces perform the function of locating the project plate with respect to its supporting chuck 50 and, therefore, control its accuracy. The inner portion of the locator ring 21 has an inwardly and rearwardly inclined, forwardly facing annular cam surface 25. The ring 21 also has a notch 26 which serves to index the project plate circumferentially of the support chuck 50 (FIGS. 1, 2 and 4).

At the center of the project plate 10 is a countersunk central opening 30 which seats the draw pin 31. The draw pin has a head having the shape of a spherical segment seated in the countersunk recess of the central opening. The opening is covered by a plate 32 secured by screws. A spring 33 forces the pin to seat rearwardly in the countersink. The rearward end of the draw pin has a head 34 of arrowhead shape providing a forwardly facing shoulder. Surrounding the draw pin the rear face of the face plate is recessed at 35 to provide operating room for the collet 85 of the chuck.

The rear face of the face plate portion 12 of the project plate is also provided with radially extending alternate ribs 36 and recesses 37 which reduce weight while maintaining the structural integrity and rigidity of the face plate portion.

Figure 5:
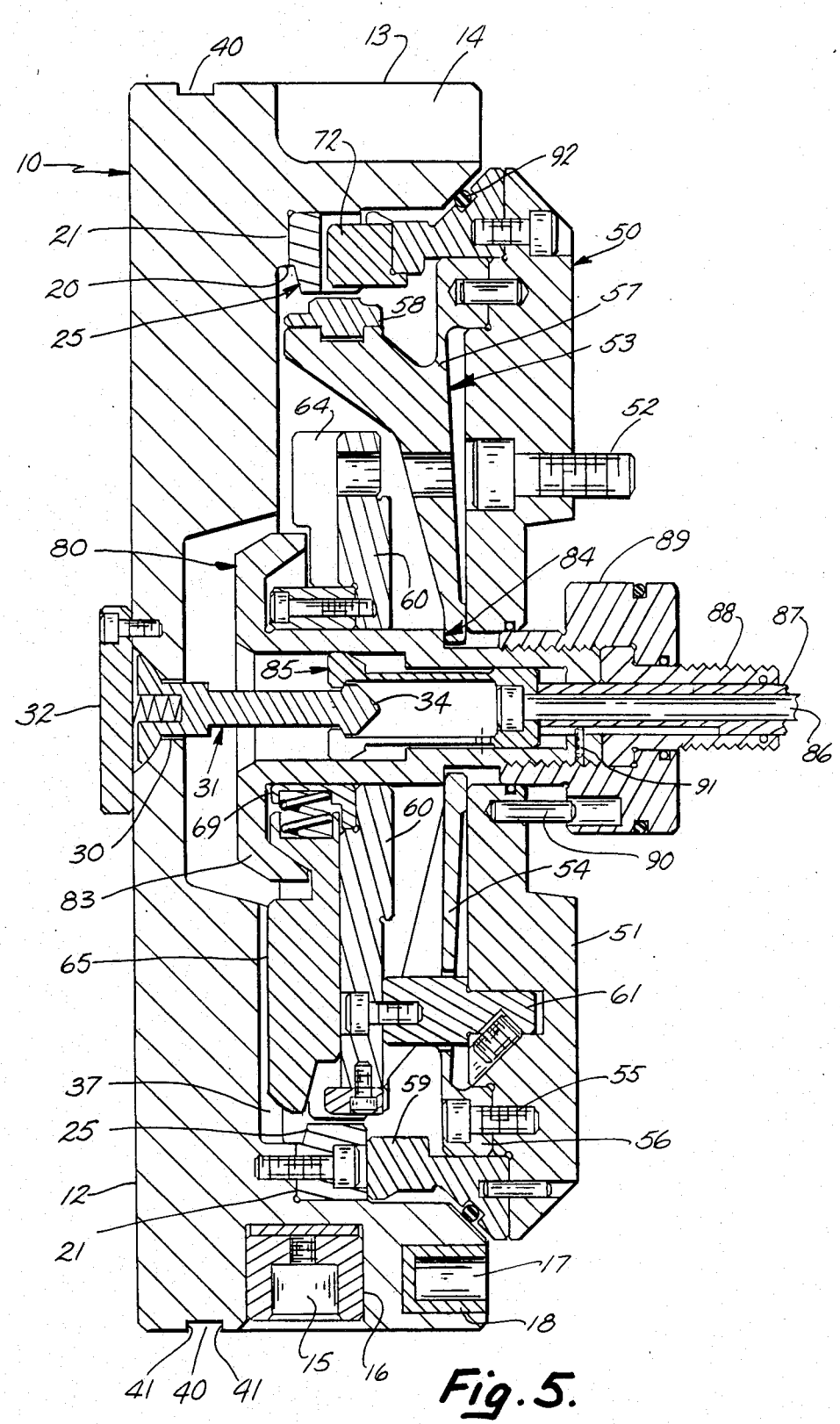
FIG. 5 is a sectional view taken along the same plane as FIG. 4 illustrating the project plate and support chuck assembled but not yet locked together.

Machined into the circumferential face of the project plate is a channel 40 (FIGS. 4, 5 and 6). The channel is adjacent to but spaced rearwardly from the front face of the project plate. The inner wall or base 41 of the channel is precisely machined as by grinding to precise concentricity with the central axis of the plate. This is very important because the inner wall 41 is the surface by which the concentricity of the project plate is measured. It is also by reference to this surface that the part or workpiece is located when it is mounted on the plate. The rear wall 42 of this channel 40 is also machined as by grinding to be very accurately spaced from the front surface of the project plate. It the project plate's front surface has any deviations from flatness or from being perpendicular to the central axis, the front face is machined to eliminate these deviations. The distance between the wall 42 and the front face is used to axially position the part.

Figure 3:
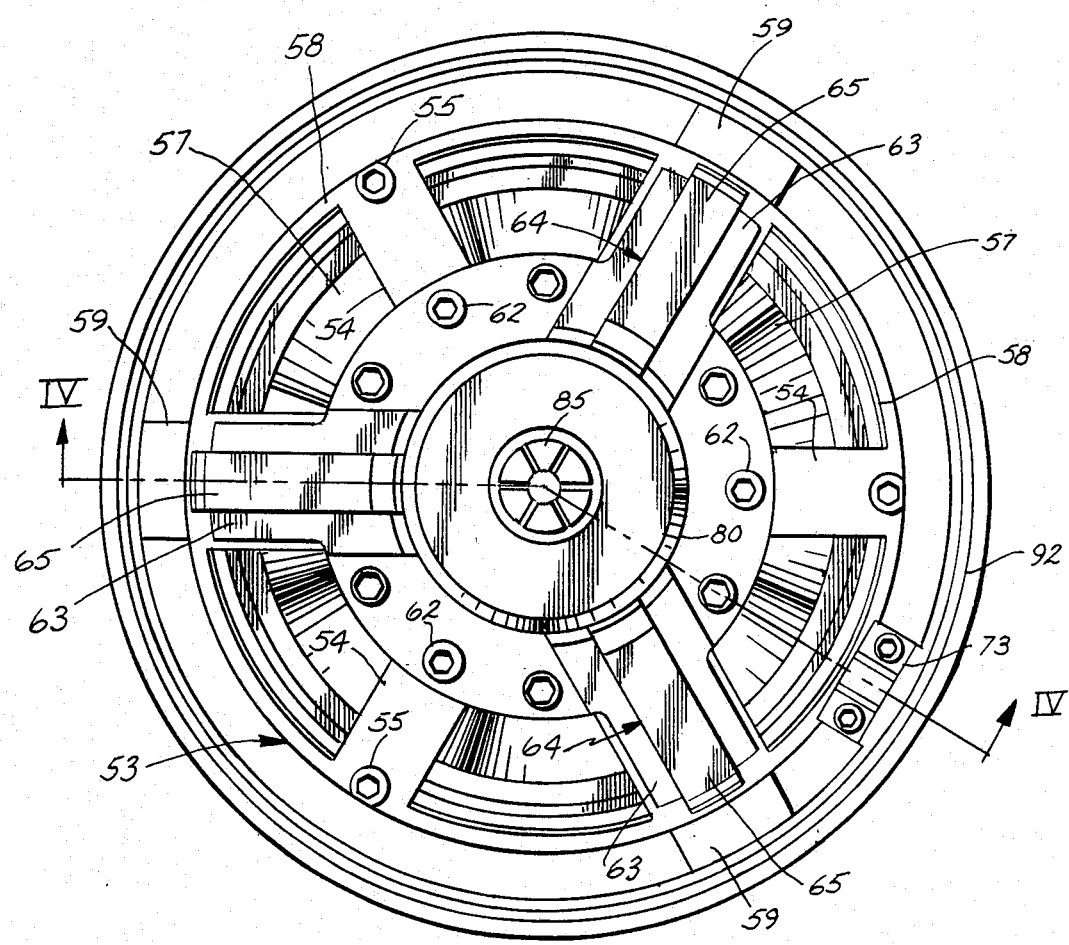
FIG. 3 is a front view of the project plate support chuck.

The project plate 10 is designed to be mounted on a support chuck 50. The support chuck has a back plate 51 designed to be secured to the face plate of a supporting machine in a conventional manner such as by the bolts 52 (FIG. 4). The precise centering of the chuck on the support machine is conventional skill of the art routinely practiced where ever precision machining is done. Secured to the front face of the back plate is a diaphragm chuck 53 of conventional construction (FIGS. 3 and 4). The diaphragm chuck has a diaphragm plate which, in the design illustrated, has six radial legs 54 each of which at its outer end is secured to the back plate by a bolt 55 (FIGS. 3 and 4). At each of the bolts 55 the legs have rearwardly extending terminal pads 56 which space the diaphragm plate 55 forwardly from the back plate whereby the central portion of the diaphragm plate can be deflected rearwardly. The legs 54 of the diaphragm plate 53 are thickest at the center and thinnest adjacent the terminal pads 56 whereby the legs adjacent the terminal pads act as resilient hinges.

Also radially extending from the central portion of the diaphragm plate are six forwardly inclined clamping arms 57. The outer end of each of the arms 57 mounts a pad 58. The support chuck as so far described is of conventional design.

Spaced forwardly of the back plate 51 and the legs 54 of the diaphragm plate is latch support plate 60 supported on pillars 61 which extend through clearance openings in the legs 54 of the diaphragm plate and are rigidly secured to the back plate 51 (FIG. 4). The support plate is attached to the pillars by bolts 62 (FIGS. 3 and 4). Projecting radially from the central portion of the support plate are three radial spokes 63. At the center of each spoke is a radially extending channel 64 for seating a latch finger 65.

The outer end of each latch finger 65 has a rearwardly facing, outwardly and forwardly inclined camming surface 66 designed to engage and be complementary to the cam surface 25 of the locator ring 21 (FIG. 6). Adjacent its inner end each latch finger 65 has a forwardly opening recess 67, the radially inner wall 68 of which is inwardly and forwardly inclined to engage the latch retractor 80. The inner end of each latch finger 65 has a blind recess aligned with a similar recess in the ring 69. Seated in the recesses is a compression spring 70 which biases the latch finger radially outwardly. The ring is secured to the support plate by bolts 71.

Aligned with the outer end of each of the latch fingers 65, the support chuck has a stop member 59 the forward face of which is very accurately machined to locate it at a precise distance from the back surface of the back plate (FIGS. 3 and 5).

Extending axially through the center of the support plate 60 and the ring 69 is the latch retractor 80 (FIG. 5). The latch retractor has a head 81 at its forward end and a rearwardly extending tubular sleeve portion 82. The head has a rearwardly extending peripheral rim 83 the inner face of which is radially outwardly and rearwardly inclined to be complementary to and engage with the inner walls 68 of the recesses in the latch fingers 65. The rearward portion of the tubular sleeve 82 is of reduced diameter creating a shoulder 84. The distance between the inner face of the head 81 and the shoulder 84 is the same as the distance between the forward face of central plate of the diaphragm chuck when it is seated against the forward face of the back plate 51 and the forward face of the latch fingers 65 (FIG. 5). The shoulder 84 seats over the forward face of the diaphragm of the support chuck 50 (FIGS. 5 and 6).

The latch retractor 80 is part of the support chuck operating mechanism. This mechanism includes a collet 85 designed to engage the rear head 34 of the draw pin 31 (FIG. 5). The rear end of the collet 85 is secured to the draw rod assembly which consists of the central rod 86 surrounded by the draw tube 87 the forward end of which abuts the rear face of the collet 85 (FIG. 5). The draw rod assembly passes through and is reciprocal with respect to the anchor nut 88. The forward head of the anchor nut 88 is seated within the closure nut 89 which is threadedly secured to the rear end of the tubular sleeve 82 of the latch retractor. The rear end of the latch retractor 80 seats on the front face of the anchor nut 88. The draw rod assembly can be reciprocated independently of reciprocation of the latch retractor and its assembled components, the anchor and closure nuts.

A pin 90 prevents inadvertent rotation of the closure nut 89 (FIG. 5). A pin 91 mounted in the tubular sleeve engages an axial slot in the draw tube 87 to prevent rotation of the draw tube. The gland nut 88 and the draw rod assembly are attached to the operating mechanism therefor of a conventional machine tool, the attachment being a routine procedure in the machine tool industry.

When the project plate 10 and support chuck 50 are locked together, the rearwardly facing chamber created by the peripheral flange is sealed by a gasket 92 (FIG. 6) mounted in the inclined perimeter of the support chuck and engages the complementary inclined inner portion of the back face of the peripheral flange. This is important because it positively isolates the indexing surfaces within the project plate from the chips and turnings generated during machining. This is essential to maintain accuracy.

OPERATION OF THE PROJECT PLATE AND ITS SUPPORTING CHUCK

Once the support chuck 50 has been secured to the machine which is to support and normally operate it, the collet 85 is moved to maximum forward position. In this position the forward end of the collet passes through the forward end of the latch retractor and, due to natural resilience, the collet fingers open sufficiently to permit the rear head 34 of the draw pin 31 to enter the collet (FIG. 4). At the same time, the latch retractor 80 is shifted to its maximum rearward position to retract the latch fingers 65 and press the central diaphragm plate of the support chuck into a concave configuration, retracting the arms 57 (FIG. 5). This prepares the support chuck ready to receive the project plate.

To mount the project plate 10, the rear head of the draw pin 31 is inserted into the collet 85 and the draw rod assembly retracted until the project plate 10 is firmly seated on the three stop members 59 (FIG. 5). As the project plate 10 is pulled toward the support chuck 50, engagement between the alignment guide 72 and the notch 26 (FIG. 5) effects the initial circumferential positioning of the project plate. This positioning is sufficiently accurate that there will be positive alignment of the final circumferential index key 73 (FIG. 3) on the support chuck 50 with the index socket 74 (FIG. 1). The liner 75 forming the index socket is very precisely machined and is also precisely located by the use of shims such as the shim 76 and locked in place by the set screw or bolt 77 (FIG. 1). Circumferential adjustment of the liner 75 is possible because the opening for the anchor bolts 78 are a few thousandths oversize. The preliminary circumferential locating of the project plate by the guide 72 and notch 26 is necessary because the fit between the socket of the liner 75 and the index key 73 permits only minimal play as the two are mated. This is necessary to maintain circumferential accuracy within ±0.00015 of an inch.

During this preliminary procedure the project plate 10 is held against the support chuck 50 only by the pull exerted through the collet 85 acting on the draw pin 31. It will be noted in FIG. 5 that while the project plate is being so held the rearward end of the collet 85 is spaced forwardly of the rear end of the latch retractor 80. This permits the latch retractor to shift forward sufficiently to release the central diaphragm plate of the diaphragm support chuck before the collet 85 releases the draw pin 31. The release of the central diaphragm plate permits the arms 57 to pivot outwardly and thus the pads 58 to firmly engage the radial inner surface of the locator ring 21. This positively and automatically positions the project plate concentrically of the support chuck 50. This is essential to assure concentricity within 0.0002-0.00035 of an inch.

The forward movement of the latch retractor 80 permitting the arms 57 of the support chuck to grip and center the project plate is insufficient to release the latch fingers 60 to engage the locator ring 21. For this purpose it is important that outward movement of the latch fingers results from a spring bias rather than being forcibly extended such as by a camming action. Thus, the latch fingers do not interfere with the centering of the locator plate. However, further forward movement of the latch retractor releases the latches to engage and cam against the forward cam surface 25 of the locator ring 21 (FIG. 6). Once again it is important that the extension of the latch fingers is spring powered rather than positively forced such as by a camming action or the like because it permits each latch finger to firmly engage the locater ring without applying a force which would have a tendency to shift the project plate eccentrically.

It will also be noted from FIG. 6 that during the last increment of forward movement of the latch retractor 80, occurring after the latch fingers are seated in their extended position, the rearward end of the latch retractor bottoms against the rear end of the collet 85 and shifts it forward to release the draw pin 31. This eliminates any possibility that the collet and the central rod 86 might exert a force on the project plate that would tend to render it concave and, thus, distorted.

Figure 8:
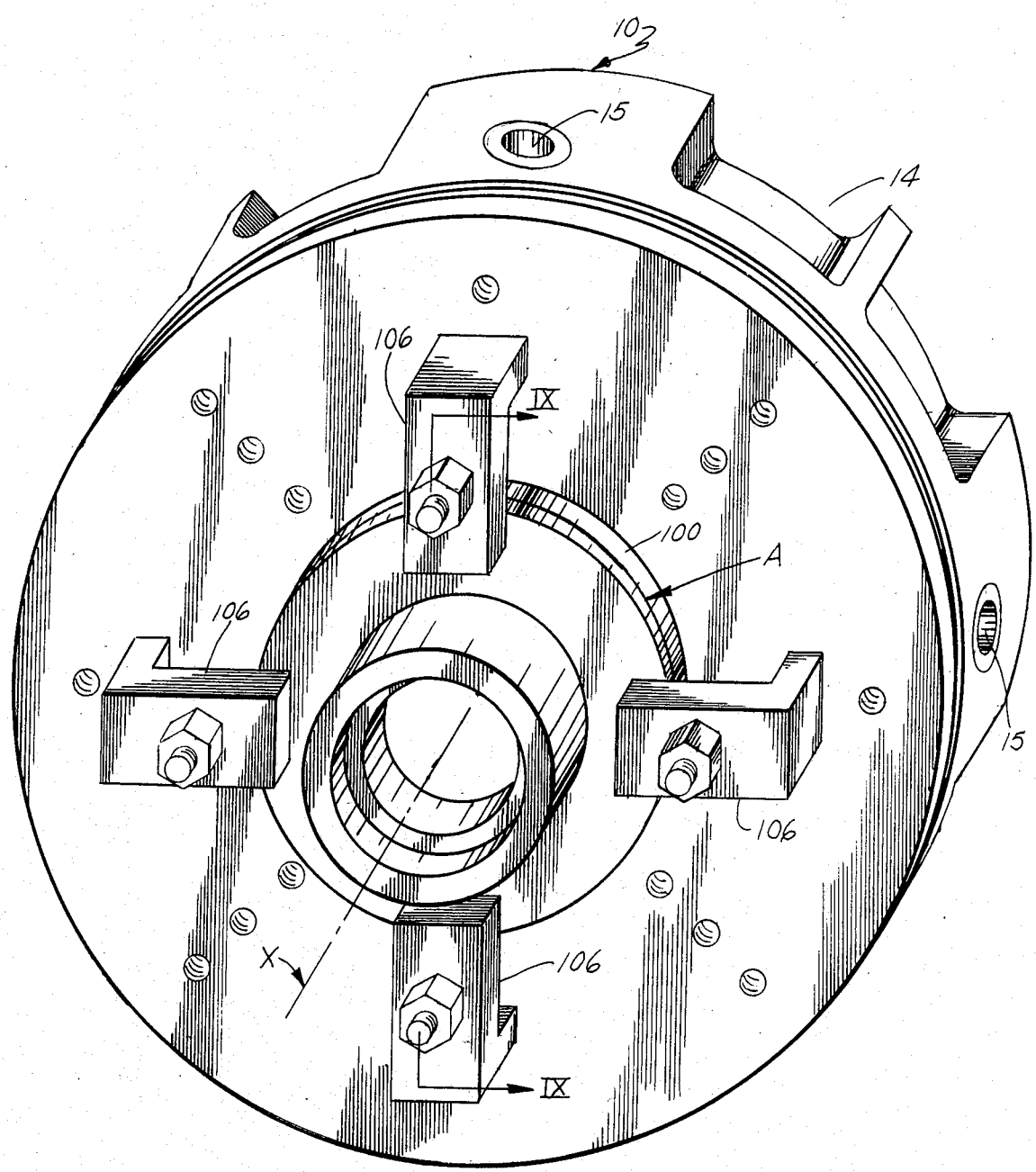
FIG. 8 is a perspective front view of a project plate with a part mounted for machining.
Figure 9:
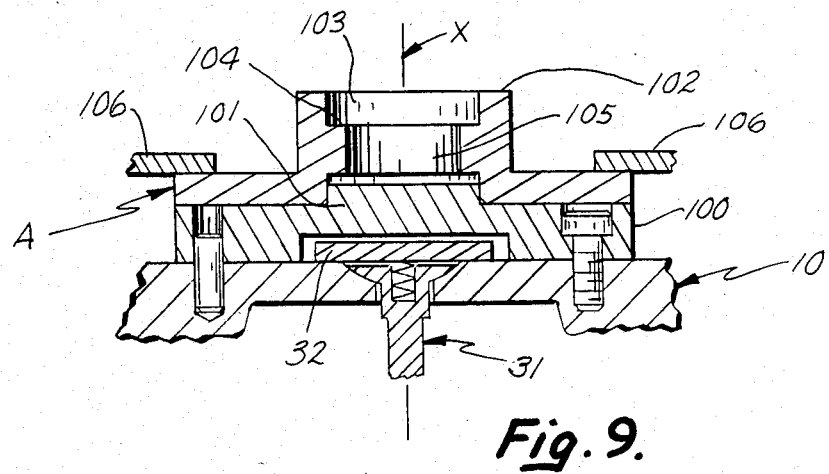
FIG. 9 is a fragmentary sectional view taken along the plane IX—IX of FIG. 8.

The workpiece or part to be machined can be secured to the project plate in any of a number of ways, the choice of attachment mechanism being, to a large extent, governed by the design of the part and by the machine work to be performed on it. FIGS. 8 and 9 illustrate a very simple approach when the part A itself is not complex. In this case the part A is seated on a locator block 100 which bridges the cover plate 32. The locator block 100 has a boss 101 which seats snugly within the back opening of the workpiece A. The locator block 100 is precisely located to center the boss about the central axis X of the project plate 10. To accurately locate the part A axially of the project plate, the thickness of the locator block 100 is very precisely controlled so that the axial position of the part A is positively controlled to be within the desired tolerance.

Part A is firmly secured to the project plate in this position by suitable means such as the clamps 106 and the outer surface 102 can be planed, milled or ground to the desired finish and height. The outer inside surface 103 of the part can be machined by boring, turning or reaming to the desired I.D. and finish and the position of the shoulder 104 can be deepened or reshaped as needed. The surface 103 could be threaded or tapered as required. In a similar manner the inner inside surface 105 could be machined. An undercut channel could be machined into either or both of the surfaces 103 and 105. Each of these machining steps can be performed at a different machine while maintaining very close tolerances because once the part has been properly mounted on the project plate, moving it from one machine or work station to another can be accomplished without unacceptable tolerance accumulation since the project plate permits repeatable workpiece positioning with ±0.0003 of an inch, repeatable concentricity with 0.0002 to 0.00035 of an inch and repeatable axial positioning within ±0.00005 of an inch. This is true because the project plate 10 at each machine is mounted on an identical self-centering support chuck having the identical locating means for precisely locating the project plate and therefor the part to be machined.

With part A it will be recognized that all of the machining to be performed on it could be performed on machines on which the project plate and workpiece are rotated or could be performed on machines on which the part project plate and workpiece are stationary and the tools are in motion. Alternately, some of the machining could involve holding the workpiece stationary part and others of the machining operations could involve rotation of the workpiece. Due to the unique control of tolerance accumulation made possible by this invention, such as mixture of machining procedures, is possible for the first time. More particularly is this true of parts which must be machined to close tolerances.

Figure 10:
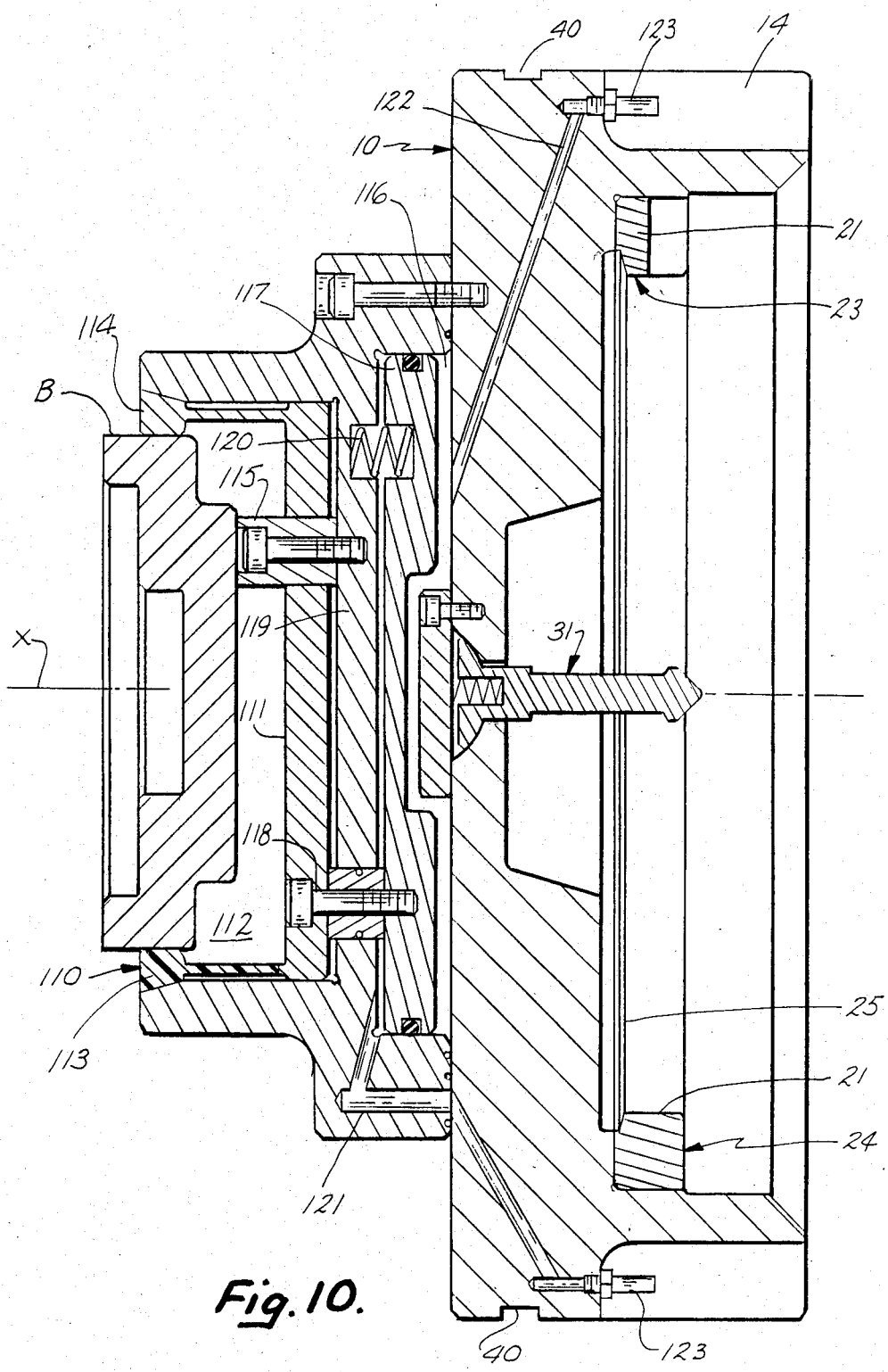
FIG. 10 is a central sectional view of a project plate equipped with a collet for holding the part for machining.

FIG. 10 illustrates a different approach to supporting a part or workpiece B. In this case a collet 110 is concentrically mounted to the outer face of the project plate 10. The collet has a main body 111 having a part receiving chamber 112. Within the chamber 112 the collet has a plurality of part gripping fingers 114 which are designed to resiliently shift radially outwardly to release the part B when not confined within the walls of the chamber 112. The spaces between the fingers 114 are filled with a flexible membrane 113 to prevent chip entry into chamber 112 or between the fingers. A suitable material for forming this membrane is a silicone rubber adhesive sealant such as "Silastic" 732 RTV marketed by Dow Corning Corporation.

The axial position of the part is controlled by a plurality of stops 116 the tops of which are machined to be very accurately spaced from the surface of the project plate 10.

The base portion of the main body has a cylindrical cavity 116 which is located at piston 117. The piston 117 is secured to the collet member 113 by posts 118 which pass through the partition 119 separating the cavity 116 from the chamber 112. The piston 117 is biased rearwardly by springs 120, thus, drawing the fingers 114 of the collet member 113 into the cavity and compressing them into part clamping position as illustrated in FIG. 10. This action may be accelerated and/or the action of the springs supplemented by compressed air introduced into the cylindrical cavity in front of the piston 117 through conduit 121. However, in most cases this is not necessary because the springs 120 normally are adequate for this purpose. The release function of the piston 117 and the collet 110 can be effected through the conduit 122. This action will be necessary in most applications to hold the collet 110 open against the bias of the springs 120 during part substitution. In the case of both conduits 121 and 122, compressed air is introduced through check valves 123 which could be of the type used with vehicle tires. This arrangement is possible because the piston 117 is actuated only when the part B is being mounted or removed. This function is performed at a project plate service station equipped for this purpose while the project plate is removed from the support chuck 50.

To maintain accuracy it is important that the collet 110 be concentric with the project plate 10. This again is done at a specially equipped station while the project plate is dismounted from the support chuck. However, once the collet has been accurately positioned, this accuracy can be dependably maintained so long as the collet/project plate assembly is used.

Figure 13:
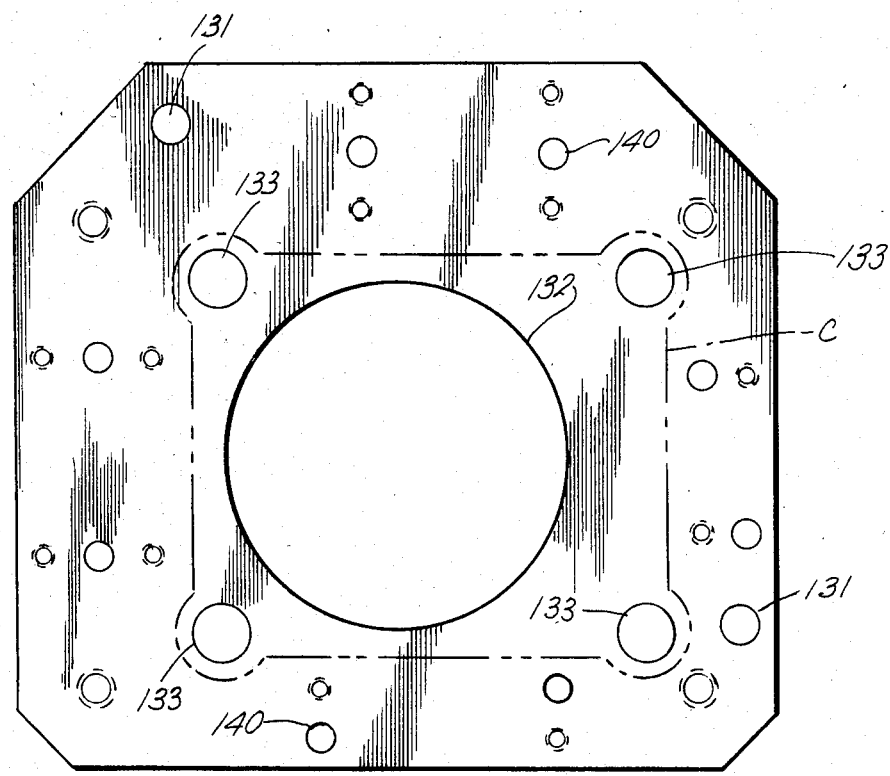
FIG. 13 is a front view of the spacer plate used in FIGS. 11 and 12.
Figure 11:
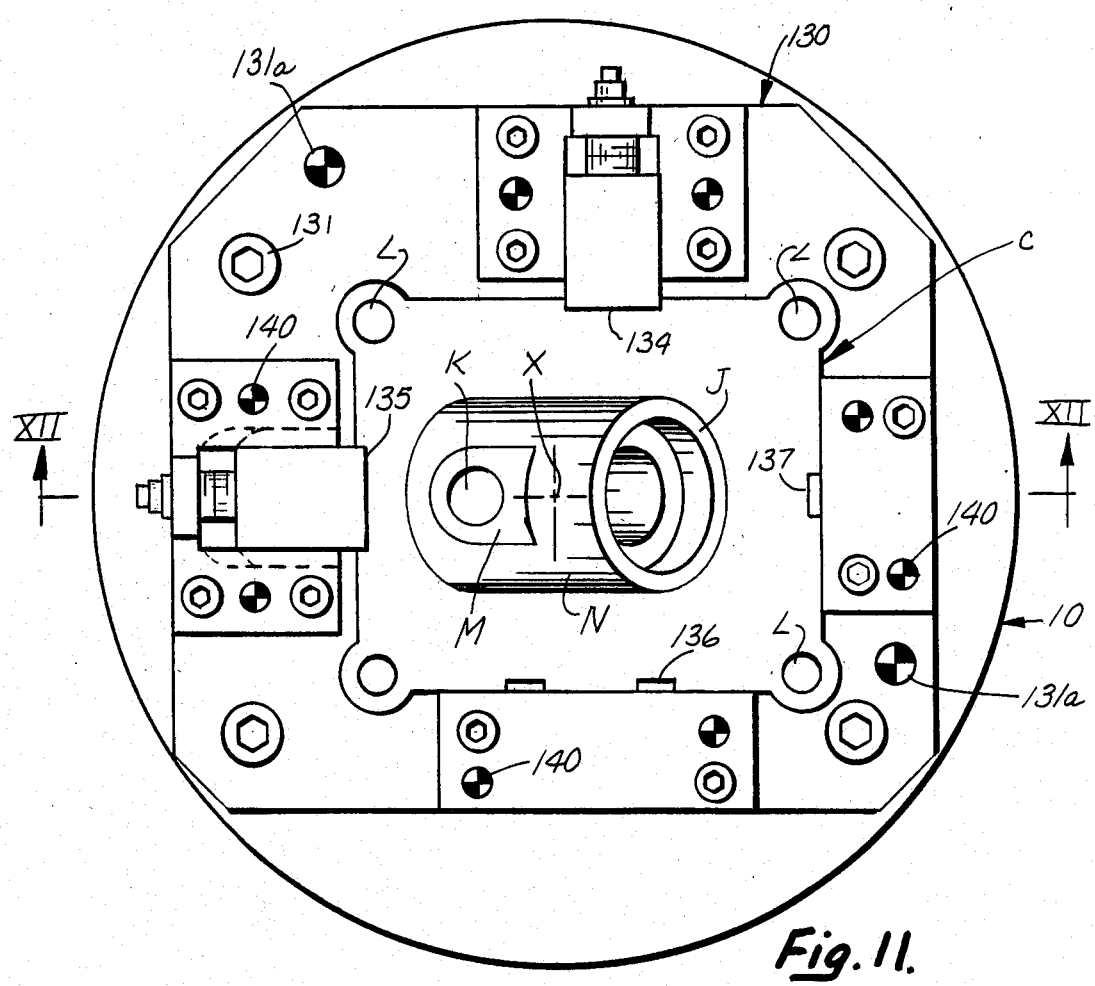
FIG. 11 illustrates a part of a different design mounted on a project plate for machining.
Figure 12:
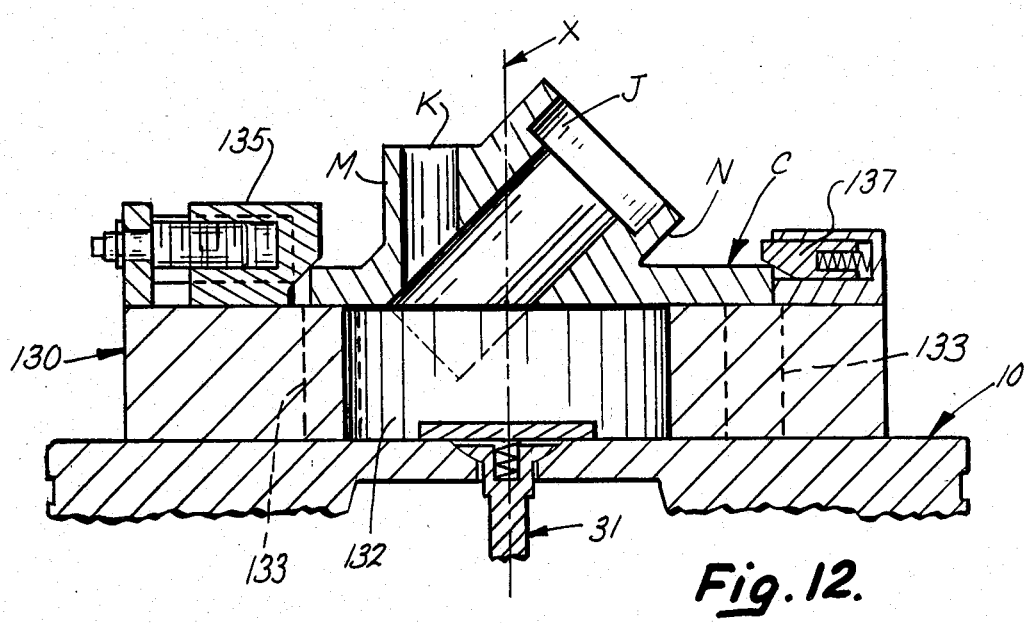
FIG. 12 is a sectional view taken along the plane XII—XII of FIG. 11.

FIGS. 11, 12 and 13 illustrate the fact that the project plate 10 can be used for the machining of parts which have machining targets that are not concentric with the central axis of the project plate 10. It also illustrates the fact that a part can be so mounted that tools may pass entirely through it.

As illustrated in FIGS. 11 and 12, a spacer block 130 is mounted to the face of the project plate 10 by suitable means such as the bolts 131. Its precise location is controlled by index pins 131a. The thickness and parallelism of front and back surfaces of the spacer block must be very precisely controlled because this block controls the axial position of the part C and the parallelism of its surfaces to the project plate surface. Thus, the accuracy of the machining will be performed on the part largely controlled by this block. The spacer block has clearance holes for the tools to pass through the part C including the central clearance hole 132 and the secondary clearance holes 133. The part C is mounted on the spacer block by clamps 134 and 135. The clamps 134 and 135 hold the part C firmly against the indexing stops 136 and 137. The clamps and index stops can be located by the use of index pins 140. This arrangement for positioning and clamping the part is illustrative only because various other indexing and holding means of different design can be used to accomplish the same purpose.

It is essential that the part C be very precisely located with respect to the central axis X of the project plate 10. This axis is shown as passing through the geometric center of the part C. This is an arbitrary selection for positioning the part C because, for example, the center of the opening K could just as well have been selected for this purpose.

With the part C mounted on a project plate 10 as illustrated in FIG. 11, the mounting holes L can be bored and/or reamed to size. The face of the boss M can be milled to the precise height and made parallel to the back surface of the part. The opening K can be machined, counterbored, threaded or reamed as needed. Each of these operations can be carried out at a different machine without significant accumulation of tolerances because of the accuracy of the project plate.

At still other machining stations, the face of the inclined boss N can be machined and the opening J machined and counterbored again with control of tolerance accumulation not heretofore possible. For the purpose of machining the boss N and opening J, the support chuck 50 will be stationary and may be inclined at an angle such that the central axis of the opening J is aligned and concentric with the axis of tools which are either vertical or horizontal.

The clearance hole 132 permits the tools to pass entirely through both the openings J and K. Clearance holes 133 are also provided for the tools machining the mounting openings L.

Prior to machining part C in the manner illustrated in FIGS. 11–13 it may be considered desirable to establish the back face of part C as a precisely known reference surface. This could be done on a project plate 10 using a different spacer block so designed that the part can be inverted with bosses M and N seated in a clearance opening and then the back surface machined by milling or grinding. This would be an important first step in establishing the exact point of intersection of the central axis of the opening J with the plane of the work surface to provide a reference for the machining to be done to opening J and the face of the inclined boss N. Because of the precision with which the project plate can repeatedly maintain the position of the parts, the fact that this procedure will require the part C to be transferred from one project plate to another during the machining process will not result in unacceptable accumulation of tolerances.

The face that during machining chips and turnings will accumulate in the clearance holes 132 and 133 is not a problem in the case of this invention because the replacement of the machined part with an unmachined one does not occur while the project plate is at one of the machining stations. This cleaning function is performed at a specially equipped location or station where facilities are provided to clear the project plate of chips and turnings after the machined part has been removed. The chips and turnings accumulated in the clearance openings can be removed by vacuum or compressed air and the surface of the plate and of all the positioning and clamping devices thoroughly cleaned. With proper design of the indexing and clamping devices, the entire dismounting, cleaning and part mounting functions can be performed by robots.

The fact that the project plate is not serviced while at a machining station or cell has other very important aspects. With conventional systems to prepare each work station or tool for a different part the station has to be taken out of production while the part support fixture is accurately fitted to the part support whether it is a plate or a support of a different type. In other conventional systems the station and its tool must be taken out of production while the workpiece support is reconstructed to receive a part of a different design. This is a costly procedure eliminated by this invention. All of the work necessary to properly mount and locate the part is done at a service station away from the tool leaving the tool available to continue machining other parts. This is possible because by equipping the service station with a self-centering chuck this work can be completed and accuracy checked while the project plate is at the service station. Because the support chucks have identical concentricity the work done at the service station can be relied upon to produce identical results at the machine stations. Thus, the down time, if any, at the work station is only that necessary to change tools. The elimination of down time for machine station set up is economically important.

The system can be used with all aspects of machining including operations in which the part is held stationary or is moved. Thus, it can be used with milling, grinding, boring and reaming machines or on a lathe. It can also be used at checking and gauging stations. Once a part of a particular design is no longer needed, the part gripping means can be removed from the plate and replaced by means suitable for a different part. Thus, the plate itself is a reusable item.

The project plate 10 is particularly designed for use with robots. It is provided with four equally spaced, radially opening sockets 15 in the peripheral flange 13 (FIG. 1) to permit the plate to be engaged by robot tongs for transport and pivotal movement about two axes spaced 90° apart. The back face of the flange 13 is equipped with four additional sockets 17 and 17a, one of which (17a) is unequally spaced from the others. These sockets are designed to engage locator pins at the service stations where the project plates are loaded and unloaded. By having one pin unequally spaced the circumferential orientation of the project plate is automatically controlled. This is essential because every part must be identically positioned circumferentially. Since it is intended that all functions at this service station will be executed robotically, the station and project plate must be so equipped that robots can function with it.

The sockets 15, 17 and 17a are all equipped with bushings 16 and 18 which are press fitted into the sockets and preferably accurately machined after installation. These are made of hardened metal such as tool steel to withstand repeated use without becoming enlarged or eccentric. Since the depth of the radially extending sockets is important to aligning the project plates' central axis X with the corresponding axis of both the support chucks and the service station, the depth of the opening in the bushing is important. This can be controlled by use of appropriate shims such as the shim 138 in FIG. 5.

It will be recognized that if the project plate and its mounted part are to be rotated during any of the machining operations, it is important that the project plate with part and the part attachment means be balanced to eliminate any weight eccentricity and thus eccentric motion and misalignment during machining as well as unnecessary and excessive wear on the equipment and tools. This can be done by removal from or addition of material to the project plate at locations and in amounts necessary to eliminate any eccentricity of weight distribution. Particularly is this essential if high speed machining is involved.

If all of the machining functions are to be carried out while the project plate is stationary, the same degree of uniformity of weight distribution need not be maintained. However, since the entire use of the project plate system contemplates robotization, in all probability only minor departures from uniform weight distribution will be functionally acceptable. The procedures for attaining uniformity of weight distribution are well known to the art and do not require further detailing.

The project plate itself can be made from any suitable material such as aluminum, steel or ductile iron. Preferably, it is machined from a single block of ductile iron because this material, while heavy, provides the desired strength and rigidity coupled with desirable machining characteristics. The fact that all of the critical indexing surfaces are either within the rearward facing recess formed by the peripheral flange 13 or at the rear surface of the flange is important because this fact largely shields these surfaces from the chips and turnings resulting from machining. It is essential that these indexing surfaces be absolutely free of anything that would cause misalignment of the project plate 10 with respect to the support chuck 50. Again, automatic facilities can be provided at each machining station to remove any extraneous material which may become lodged on these surfaces and if the removal is unsuccessful to either set the project plate aside or temporarily shut down the machining station.

The project plate can be used to support parts for almost any type of machining operation. By mounting one of the support chucks 50 to a tool such as a lathe, drill press, mill, coordinate measuring machine, milling machine or grinder indexer, the project plate can be used to accurately and positively hold a part during the machining process. However, in all cases a support chuck 50 is used to hold the project plate.

While the design, engineering and actual mounting of the devices to hold the parts on the project plate may require ingenuity, time and expense, once this has been completed for a particular part, the result can be repeatedly used for the machining of many thousands of parts with predictable and dependable control of tolerances and elimination of rejects and scrap. Thus, the invention is capable of significant savings in materials and labor.

Having described a preferred embodiment of the invention and illustrated a few examples of its versatility, it will be recognized that various modifications of the invention and its method of application can be made without departing from the principles of the invention. Such modifications are to be considered as included in the hereinafter appended claims unless the language of the claims expressly states otherwise.

We claim:

1. Means for supporting and positioning a workpiece with respect to the machine elements to be applied to and machine the workpiece, said means being adapted to be mounted on a radially outwardly clamping self-centering support chuck, said means including a project plate having a central axis, said plate having front and back faces, said front face being adapted to mount a part to be machined; first support chuck engaging first means secured to the back of the plate and having a rearwardly extending circular radially inwardly facing position indexing surface precisely located with respect to and concentric of said central axis of said plate and second support chuck engaging means on said plate for precisely locating said project plate axially along said central axis with respect to the support chuck said second support chuck engaging means having a forwardly facing inwardly and rearwardly inclined cam surface; radially sliding cam means on said support chuck having a complementary cam surface for engaging said inclined cam surface on said plate for pulling said second support chuck engaging means against said chuck, means biasing said radially sliding cam means into plate engagement, said chuck having retractor means for delaying the engagement between said cam means and cam engaging means until said first support chuck engaging means has centered said project plate whereby said plate can be relocated from one support chuck to another utilizing said radially facing indexing surface as the sole concentricity reference and said second means as the sole axial position reference with respect to any machine element associated with each support chuck.

2. Means adapted to be mounted on a radially clamping self-centering support chuck for supporting and positioning a workpiece with respect to the machining elements associated with the support chuck to be applied to the workpiece, said means including a project plate having a central axis, a front plate portion and a rearwardly extending peripheral flange defining a rearwardly extending chamber closed at its forward end by the front plate portion; support chuck engaging means arranged in a circle within the chamber, said means extending axially to provide a radially facing first surface concentric with the central axis of said project plate for precisely locating the central axis of the plate concentrically of the central axis of the supporting chuck, radially movable gripping elements on said support chuck for engaging said first surface to center said plate; said means, having a second surface within the chamber, said surface being an axially facing rear surface parallel to and at a predetermined spacing from the front face of said front plate portion for precisely locating said plate axially along the central axis of the support chuck, said means including a locator surface, said locator surface extending radially inwardly and facing and spaced from the front plate portion, said locator surface being inwardly and rearwardly inclined to provide a support chuck engaging cam surface, said support chuck having clamping means with complementary camming surfaces, means mounting said clamping means solely for radial movement between retracted and engaged positions for engaging said locator surface, and axially positioning said plate solely by interengagement of said camming surfaces; said plate being adapted to mount a workpiece on the face of the front plate portion opposite from said chamber, means for actuating said gripping elements and said clamping means sequentially to assure concentricity of said plate before it is clamped.

3. The means for supporting and positioning a workpiece as described in claim 2 wherein said first support chuck engaging means is a ring and said second surface is the rearwardly directed face of said ring.

4. The means for supporting and positioning a workpiece as described in claim 2 wherein means are provided for indexing each project plate in the identical circumferential position, said means including a rearwardly facing circumferential index member recessed into the rear face of said flange, said member being circumferentially movable for micro-circumferential positioning, means for locking it rigidly to the project plate.

5. The means for supporting and positioning a workpiece as described in claim 2 wherein four equally spaced radially opening sockets are provided in the outer face of said flange for receiving support means during transfer between work stations, a bushing lining each of said sockets.

6. In combination a project plate and a support chuck therefor, said project plate having a flat front surface and a central axis and first support chuck engaging means concentric with said central axis and second support chuck engaging means preferably spaced from said front surface, said first chuck engaging means being rearwardly projecting locator member of circular configuration having a radially facing position indexing surface arranged concentrically of the central axis of said project plate, said locator member having a radially inwardly opening channel therein the rearward wall of which slopes inwardly and rearwardly at a minor angle, said support chuck having a plurality of project plate gripping elements and means for shifting said elements radially between project plate release and indexing surface gripping positions; said elements being independently movable with equalized force whereby they automatically position the central axis of the project plate concentrically with the central axis of the support chuck; said support chuck having stops engaging said second support chuck engaging means for positioning said project plate axially of said support chuck; radially reciprocal latching means mounted on said support chuck and having wedge-like camming surfaces at their outer ends complementary to and for engaging the rearward wall of the channel in said locator member of said project plate to wedgingly pull said plate and chuck member together, a latching means retractor and an actuator therefor, said actuator holding said latching means in project plate disengaged position until said project plate has been positioned concentrically by said elements.

7. A means for supporting and positioning a workpiece during progressive machining through a plurality of work stations wherein the workpiece is positioned in successive order in front of a plurality of tools each of which is to perform a machining function on the workpiece, said means including: a radially clamping self-centering support chuck at each work station and each support chuck having radially movable clamping fingers; a project plate having a central axis; means on the front face of said project plate for rigidly and detachably securing the workpiece to said project plate in a position precisely indexed to the central axis of said project plate; the project plate opposite from said front face having a rearwardly extending circular radially facing position indexing surface concentric with said central axis and adapted to be gripped by each of said support chucks; rearwardly extending second means on said project plate having rearwardly facing surfaces precisely spaced from said front face; said fingers of said support chucks and said indexing surfaces being axially aligned when said plate is mounted on a support chuck, said clamping fingers rendering the central axis of the project plate concentric with the central axis of each support chuck, each support chuck having stops for engaging said second means of the project plate for axially positioning said project plate with respect to the chuck; means at each work station for locking the project plate in position after said project plate has been positioned radially and axially, said indexing surface being a locator member having an inwardly and rearwardly inclined cam surface of spaced from and facing said rear face of said plate; said chuck having a plurality of radially extending cam fingers, control means on said chuck for holding said fingers retracted until said gripping means has engaged said locator member and positioned said plate concentrically of said support chuck; resilient means independently urging each of said cam fingers into engagement with the cam surface on said locator member upon release of said fingers by said control means.

8. The method of accurately positioning a workpiece at a plurality of separate work stations each equipped with an identical support chuck having self-centering radially clamping fingers and axial positioners, including the steps of mounting the workpiece on the front face of a plate in a predetermined position with respect to both the plate's central axis and its front face, providing the plate with a rearwardly extending circular radially facing indexing surface; seating the plate on the support chuck of a work station and against the axial positioners, while the plate is freely radially movable causing the support chuck fingers to each independently engage radially about the plate's indexing surface with equalized gripping pressure to grip the plate and arrange the plate's central axis concentric with the central axis of the support chuck, locking the plate in position by sliding with respect to each other the surfaces of a plurality of pairs of complementary inclined wedging surfaces to shift the plate axially against the support chuck, releasing the plate from the support chuck and successively transporting the plate and mounted workpiece to each of the work stations and at each work station repeating the steps of radially gripping, positioning and locking the plate in position to precisely repeat the exact radial and axial position of the plate and its workpiece with respect to that work station and subsequently releasing the plate from the support chuck at that work station.

9. A means for supporting and positioning a workpiece at a work station with the workpiece automatically and precisely positioned in front of a tool which is to perform a machining function on the workpiece, said means including: a radially clamping self-centering support chuck at the work station having radially movable clamping fingers; a project plate having a central axis and a front face perpendicular to said axis for rigidly and detachably securing the workpiece in a position precisely indexed to both the front surface and the central axis of said project plate; the project plate opposite from said front face having a rearwardly extending circular radially facing first position indexing surface concentric with said central axis and adapted to be gripped by said support chuck; a rearwardly extending second position indexing surface on said project plate, said second indexing surface being rearwardly facing and precisely spaced from said front face; said first and second indexing surfaces being surfaces of a ring mounted to the back surface of said project plate; said clamping fingers of said support chuck and said indexing surface being axially aligned when said plate is mounted on the support chuck, said clamping fingers rendering the central axis of the project plate concentric with the central axis of each support chuck, the support chuck having stops for engaging said second means of the project plate for axially positioning said project plate with respect to the chuck; cam surfaces on the outer ends of said fingers for locking the project plate in position after said project plate has been positioned both radially and axially.

10. The means for supporting and positioning workpiece as described in claim 9 wherein said support chuck has a latch for holding said fingers in retracted project plate release position until the project plate is centered.

* * * * *